(12) United States Patent
Kuo et al.

(10) Patent No.: US 8,081,215 B2
(45) Date of Patent: Dec. 20, 2011

(54) TAGGING AND PATH RECONSTRUCTION METHOD UTILIZING UNIQUE IDENTIFICATION AND THE SYSTEM THEREOF

(75) Inventors: Vincent Kuo, Taipei (TW); Jian-Ren Chen, Hsinchu (TW); Leii H. Chang, Hsinchu (TW); Chii-Yah Yuan, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 932 days.

(21) Appl. No.: 12/060,859

(22) Filed: Apr. 1, 2008

(65) Prior Publication Data

US 2009/0160942 A1   Jun. 25, 2009

(30) Foreign Application Priority Data

Dec. 19, 2007   (TW) .............................. 96148730 A

(51) Int. Cl.
*H04N 5/225* (2006.01)
(52) U.S. Cl. ........................................ 348/169; 382/103
(58) Field of Classification Search .................. 348/169; 382/103
See application file for complete search history.

(56) References Cited

U.S. PATENT DOCUMENTS

| | | | |
|---|---|---|---|
| 6,608,551 B1 | 8/2003 | Anderson et al. | 340/10.51 |
| 6,700,533 B1 | 3/2004 | Werb et al. | 342/357.07 |
| 6,791,603 B2 | 9/2004 | Lazo et al. | 348/169 |
| 7,123,149 B2 | 10/2006 | Nowak et al. | 340/572.1 |
| 7,151,454 B2 | 12/2006 | Washington | 340/572.1 |
| 7,492,262 B2 * | 2/2009 | Washington | 340/572.1 |
| 7,929,017 B2 * | 4/2011 | Aggarwal et al. | 348/169 |
| 2001/0035815 A1 * | 11/2001 | Fletcher et al. | 340/10.6 |
| 2007/0288499 A1 | 12/2007 | Dunko | |
| 2009/0231436 A1 * | 9/2009 | Faltesek et al. | 348/169 |

FOREIGN PATENT DOCUMENTS

| | | |
|---|---|---|
| TW | 200517915 | 6/2005 |
| TW | I274296 | 11/2006 |
| TW | 200717362 | 5/2007 |
| TW | 200725429 | 7/2007 |
| TW | I286484 | 7/2007 |

* cited by examiner

*Primary Examiner* — Abdullahi Salad

(57) ABSTRACT

Disclosed is a tagging and path reconstruction method utilizing unique identification characteristics and the system thereof. The tagging and path reconstruction system comprises a plurality of readers for reading identification information having unique IDs, a plurality of cameras for taking object's image data, and a server. The server includes an identifying and tagging module, an interlaced fusion and identification module, and a path reconstruction module. The identifying and tagging module identifies and tags the object image data with unique IDs. The interlaced fusion and identification module filters, checks and updates the tagged object image data. The path reconstruction module recovers the tagged object image data, lets them regress to their original identity data, and reconstructs the motion path of each object.

17 Claims, 6 Drawing Sheets

US 8,081,215 B2

TAGGING AND PATH RECONSTRUCTION METHOD UTILIZING UNIQUE IDENTIFICATION AND THE SYSTEM THEREOF

FIELD OF THE INVENTION

The present invention generally relates to a tagging and path reconstruction method utilizing unique identification characteristics and the system thereof, and more specifically to a tagging and path reconstruction method utilizing radio frequency identification (RFID) and the system thereof.

BACKGROUND OF THE INVENTION

In the ubiquitous security surveillance era, pattern recognition and RFID technologies have been widely used in many applications.

For example, U.S. Pat. No. 7,123,149 disclosed a tracking system for assets and personnel of a commercial enterprise. The system utilizes the RFID technology for object tracking. As shown in FIG. 1, the interrogator and tracking device both communicate with a common information backbone 101. Information backbone 101 provides access to a tag identifier database. The system may completely track the object at locations equipped with an RFID interrogator, such as A, B, C, X, and Y; however, the system is completely unaware of the motion path of the object within the surveillance range.

U.S. Pat. No. 6,791,603 disclosed an event driven video tracking system. The system utilizes the camera for object tracking, and may track the object within the surveillance range, however, without knowing what the object is. When it is necessary to track a specific object, the system requires a considerable human effort and time to filter and search the large amount of video data one by one.

U.S. Pat. No. 7,151,454 disclosed a system and method for location of objects, by integrating RFID onto the camera for object locating and/or tracking. The system may be used at a passenger terminal for tracking passengers or objects; however, the system cannot track the motion path of the passenger or the object within the surveillance range.

U.S. Pat. No. 6,700,533 disclosed an asset and personnel tracking system utilizing a global positioning system (GPS). Although RFID and GPS are integrated for object tracking, the system performs outdoor object tracking while unable to know the motion path of the indoor object.

SUMMARY OF THE INVENTION

The exemplary embodiments according to the present invention may provide a tagging and path reconstruction method and system utilizing unique identification characteristics. Through the appropriate deployment of readers and cameras, the objects of the image data taken by the cameras are identified, tagged and then stored. A technique of interlaced fusion and identification is employed for filtering, checking, and updating the tagged image data so as to reconstruct the motion path of the object, i.e. the image data of the motion course of the object.

An exemplary embodiment of the present invention discloses a tagging method utilizing the unique identification characteristics, comprising: reading identification information having unique identification characteristics of an object in a region, capturing the object image data; and tagging the unique identification information to the object image data for fast searching or motion path reconstruction of the object.

Another exemplary embodiment of the present invention discloses a path reconstruction method utilizing the unique identification characteristics, comprising: continuously inputting an object identification image and reading, at least once, identification information having unique identification characteristics; combining the object identification image data and the identification information having unique identification characteristics by a tagging method; detecting the object identification image crossing other object identification image in motion; at each crossing, obtaining the distribution matrix of region crossing of the object; performing the filtering, checking, and updating the tagged image data when the unique identification information of one of the objects is read again by the reader at the endpoint or gate; and after the unique identification information of all the objects within camera surveillance range has been read, recovering the tagged object image data to let them regress to their original identity data and reconstructing the motion path of each object.

Yet another exemplary embodiment of the present invention discloses a path reconstruction system utilizing unique identification characteristics. The path reconstruction system comprises, in addition to a plurality of identification readers and cameras, a server at the backend. The readers and the cameras communicate and exchange data with the server through a network. The server includes an identifying and tagging module, an interlaced fusion and identification module, and a path reconstruction module. The identifying and tagging module performs identification and tagging on image data. The interlaced fusion and identification module filters, checks and updates the tagged object image data. The motion path reconstruction module recovers the tagged object image data to let them regress to their original identity data and reconstructs the motion path of each object.

The foregoing and other features, aspects and advantages of the present invention will become better understood from a careful reading of a detailed description provided herein below with appropriate reference to the accompanying drawings.

DETAILED DESCRIPTION OF THE PREFERRED EMBODIMENTS

In accordance with the exemplary embodiments of the present invention, the invention utilizes appropriate readers, such as RFID transponders, to read the identification information having unique characteristics on objects, and cameras to capture object image data. The identification information is tagged to the image data for fast searching or motion path reconstruction of the object.

Figure 1:
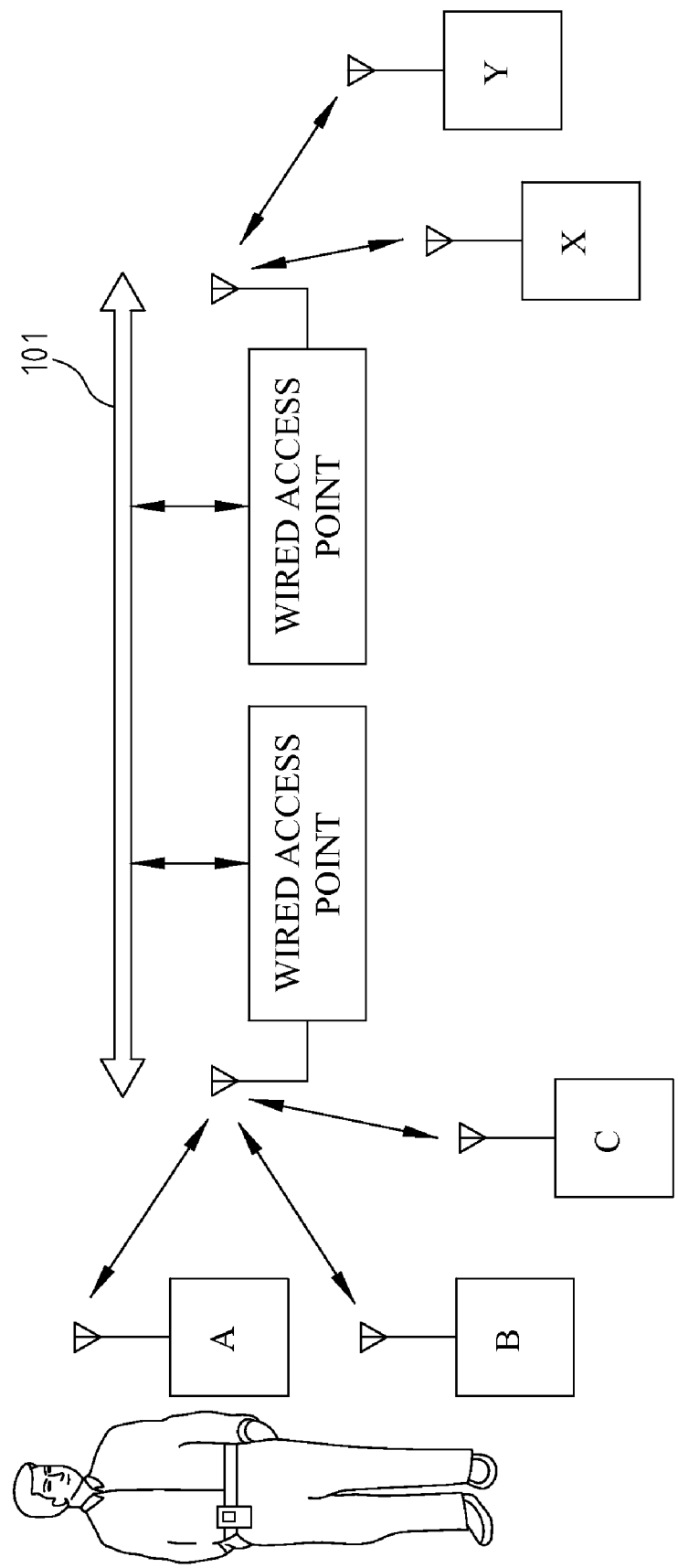
FIG. 1 shows an exemplary schematic view of an asset and personnel tagging and tracking system of a business organization of the prior art.
Figure 2:
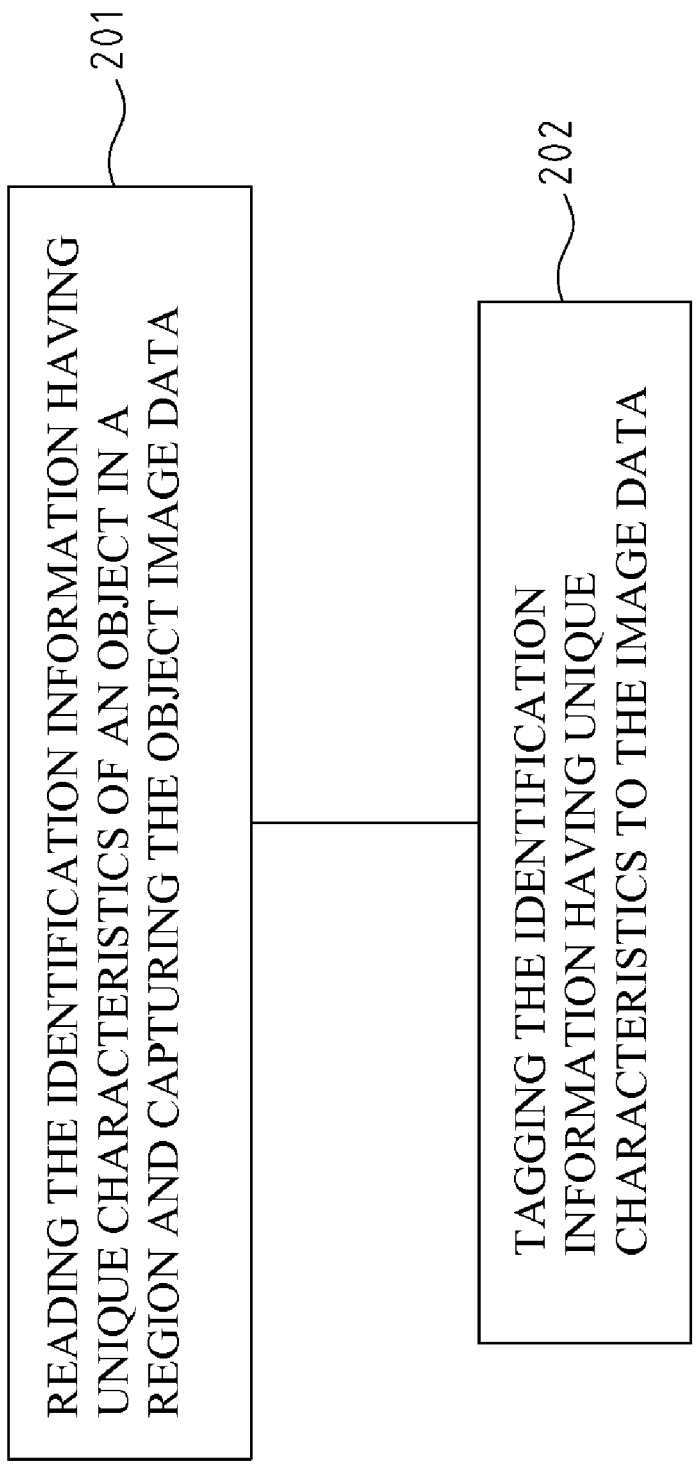
FIG. 2 shows an exemplary flowchart of a tagging method utilizing the unique identification characteristics, consistent with certain disclosed embodiments.

FIG. 2 shows an exemplary flowchart of a tagging method utilizing unique identification characteristics, consistent with certain disclosed embodiments of the present invention. Referring to FIG. 2, the identification information having unique characteristics of an object in a region is read and the object image data is captured, as shown in step 201. For example, when the object passes the endpoint or gate equipped with the reader, such as interrogator, and the camera, the identification information having unique characteristics of the object and the image data can be read and captured simultaneously. The reader may use methods such as RFID identification or biometrics identification for reading the identification information having unique characteristics of the object.

In step 202, the identification information having unique characteristics is tagged to the image data. The action of the above-mentioned information tagging may employ various types of data format, such as a numerical value, text or vector to be embedded in the image data by digital watermark, or the annotation function tool in MPEG-7. The tagged data may be stored in the storage device for fast searching or motion path reconstruction.

Figure 3:
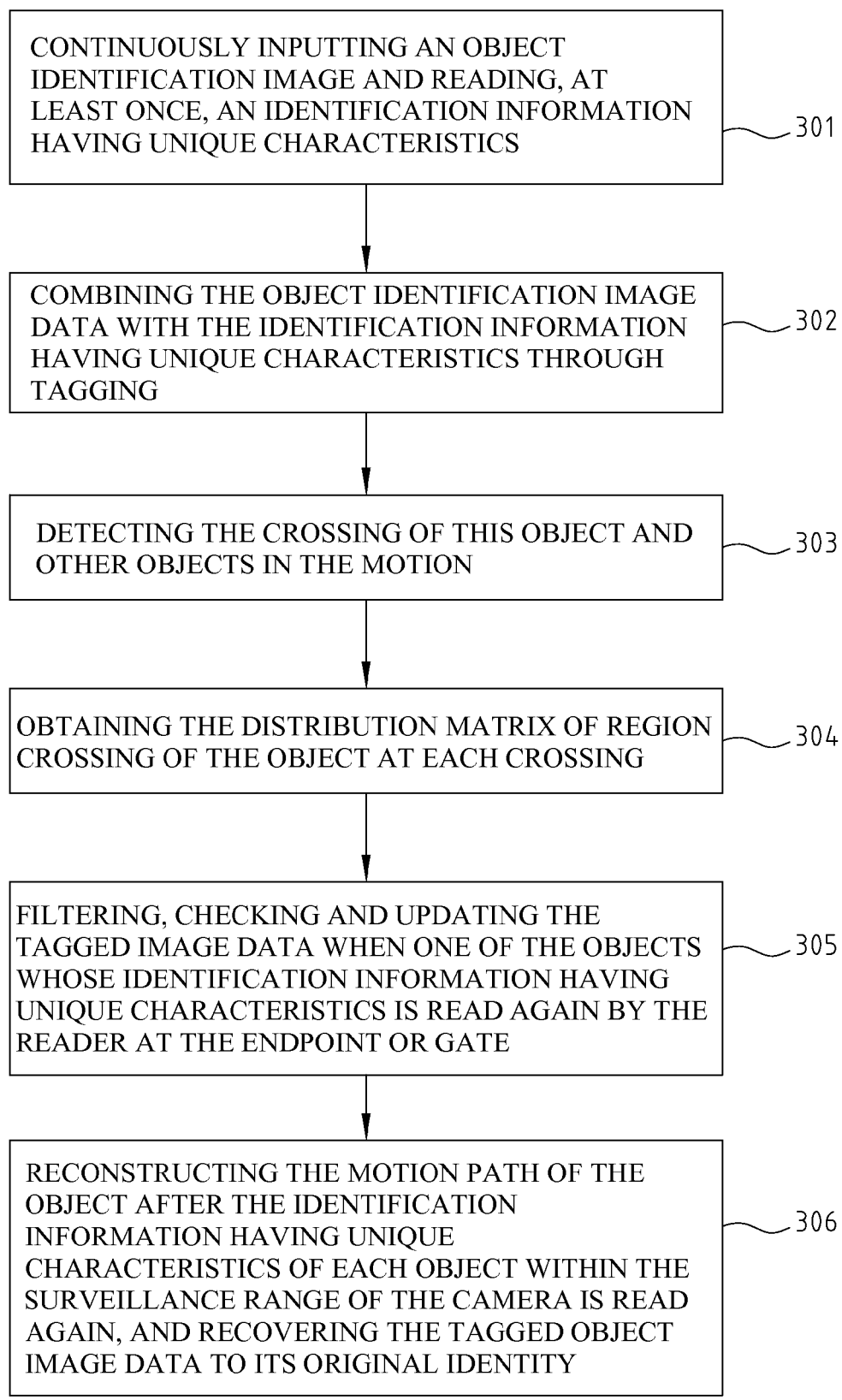
FIG. 3 shows an exemplary flowchart of a motion path reconstruction method utilizing the unique identification characteristics, consistent with certain disclosed embodiments.

FIG. 3 shows an exemplary flowchart of an object motion path reconstruction method utilizing unique identification characteristics, consistent with certain disclosed embodiments of the present invention. In step 301, it continuously inputs an object identification image and reads, at least once, identification information having unique characteristics, such as RFID identification. The continuous input of object identification images may be achieved by using a camera for continuous shooting of the object. In step 302, it combines the object identification image data with the identification information having unique characteristics through tagging. The tagged data will be stored to the storage device.

When the object leaves the endpoint or gate equipped with a reader, such as an interrogator, and a camera, the object still moves within the range of the camera surveillance. Therefore, the camera can continuously perform identification and path recording for the object within the range. The original tagged data of the tracked object will continue to tag on this object until this object crosses another object with tagged data. The tag information on both objects will be combined and retagged to the crossing object identification data.

Therefore, in step 303, the crossing of this object and other objects in the motion is detected. In step 304, the distribution matrix of region crossing of the object at each crossing is obtained. The distribution matrix of region crossing of the object may be updated by using an interlaced fusion and identification technique. In step 305, the tagged image data is filtered, checked and updated when one of the objects whose identification information having unique characteristics, such as RFID identification, is read again by the reader at the endpoint or gate. For example, the filtering, checking and updating may be performed on the distribution matrix of region crossing for each object within the surveillance range of the camera.

After many times of crossings, once one of the objects within the camera surveillance range passes the endpoint or gate equipped with reader and camera, the object is immediately identified, and the system will use an interlaced fusion and identification algorithm to perform filtering, checking and updating on the tagging information of each object within the surveillance range of the camera.

In step 306, the motion path of the object is reconstructed after the identification information having unique characteristics of each object within the surveillance range of the camera is read again and tagged object image data is recovered to its original identity. In other words, all the objects within the surveillance range of the camera are cleared up, and the motion or movement path of each object within the camera surveillance range will be accurately recovered.

Figure 4:
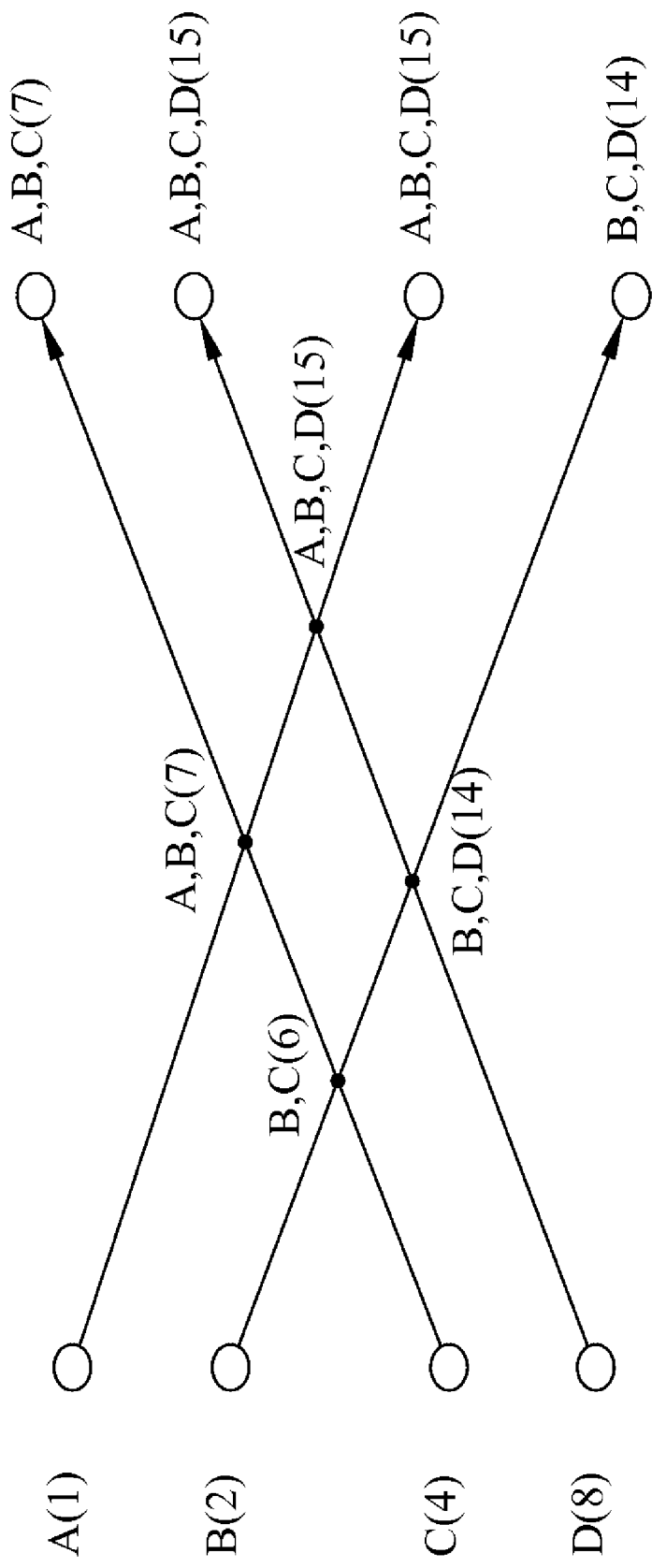
FIG. 4 shows a schematic view of an example of information tagging utilizing the unique identification characteristics, consistent with certain disclosed embodiments.

FIG. 4 shows an example of utilizing identification information having unique identification characteristics for tagging the object image data, consistent with certain disclosed embodiments. This example includes the tagging information of an object passing an endpoint or gate equipped with reader and camera, and the cumulative tagging information of the identification image data at crossing during the movement. Referring to FIG. 4, there are four objects A, B, C, D in a region. Initially, each object of A, B, C, D passing the endpoint or gate equipped with reader and camera has its own unique identification, such as, 1, 2, 4, and 8, respectively. A(1), B(2), C(4), D(8) represents the tagging of the unique identification to each object identification image data, respectively.

When an object leaves the endpoint or gate equipped with reader and camera, the object remains moving within the camera surveillance range and has four crossings. When an object crosses another tagged object, the tagging information of two objects will be combined and re-tagged. For example, when object B and object C cross each other, the cumulative information (2+4=6) will be tagged to object B and object C, as B,C(6). When object A crosses B,C(6), the tagging information is combined (6+1=7) and retagged as A,B,C(7), and so on. When object D crosses B,C(6), the tagging information is B,C,D(14). When object D crosses A,B,C(7), the tagging information is A,B,C,D(15).

Therefore, the tagging information of each object motion path may be tracked in FIG. 4, including the first time the object passes the endpoint or gate equipped with reader and camera, and the time when the object leaves the endpoint or gate equipped with reader and camera. Take object A as an example, in the course of motion of object A, the sequence of path tagging information of object A along the motion path is A(1)→A,B,C(7)→A,B,C,D(15). Similarly, the path tagging information of object B is B(2)→B,C(6)→B,C,D(14), the path tagging information of object C is C(4)→B,C(6)→A,B,C(7), and the path tagging information of object D is D(8)→B,C,D(14)→A,B,C,D(15). Therefore, the final path tagging information of objects C, D, A, B are A,B,C(7), A,B,C,D(15), A,B,C,D(15), B,C,D(14), respectively.

Each of the tagging information along an object motion path may also be represented by a corresponding distribution matrix of the region crossing. Take object A for example, A(1) may be expressed as matrix $\{1,0,0,0\}_A$, A,B,C(7) may be expressed as matrix $\{1,1,1,0\}_A$, and A,B,C,D(15) may be expressed as matrix $\{1,1,1,1\}_A$. If the matrix element is equal to 1, it means that object A has crossing with the corresponding object. Otherwise, a matrix element is equal to 0 and it implies that no crossing between object A and the corresponding object. For example, matrix $\{1,0,0,0\}_A$ implies that object A only crosses with itself, matrix $\{1,1,1,0\}_A$ implies that object A crosses with object B and object C, and matrix $\{1,1,1,1\}_A$ implies that object A crosses objects B, C, D. Therefore, the path tagging information of object A may be expressed as a distribution matrix sequence of the region crossing as $\{1,0,0,0\}_A \rightarrow \{1,1,1,0\}_A \rightarrow \{1,1,1,1\}_A$. Similarly, the path tagging information of object B may be expressed as a distribution matrix sequence of the region crossing as $\{0,1,0,0\}_B \rightarrow \{0,1,1,0\}_B \rightarrow \{0,1,1,1\}_B$, and so on.

When one of the objects passes the endpoint or gate equipped with reader and camera again, the identification of that object will be immediately identified. Once the subsequent objects pass the endpoint or gate equipped with reader and camera again, the technique of interlaced fusion and identification of the present invention may be used to identify the objects within the camera surveillance range, and the motion path of each object within the camera surveillance range may be actually recovered.

The technique of interlaced fusion and identification is to execute the following operations with respect to the distribution matrix of region crossing.

Let $N=P_j$ denote the distribution matrix of the region crossing of the object j that passes the endpoint or gate again at time T(n) and the unique information of the object j is read by the reader. Let $M=P_i$ denote the distribution matrix of the region crossing of the object, other than j, at time T(n−1) with the condition of that the object i does not pass the endpoint or gate at time T(n) where i=1, 2, . . . , n and i≠j.

Therefore, the distribution matrix $P_i$ of the region crossing at time T(n) is capable of obtaining a new distribution matrix of the region crossing after performing the logic operation of "M and (not N)" through the interlaced fusion and identification algorithm, for example, M={1,1,0,1,0,0,1,1,1, . . . }, N={0,1,0,0,0,0,0,0,0, . . . }, then (not N)={1,0,1,1,1,1,1,1,1, . . . } and "M and (not N)"={1,0,0,1,0,0,1,1,1, . . . }. In other words, the tagging information of the object being read again is deleted from the previous path tagging information of all the objects that have not yet been read again.

Figure 5:
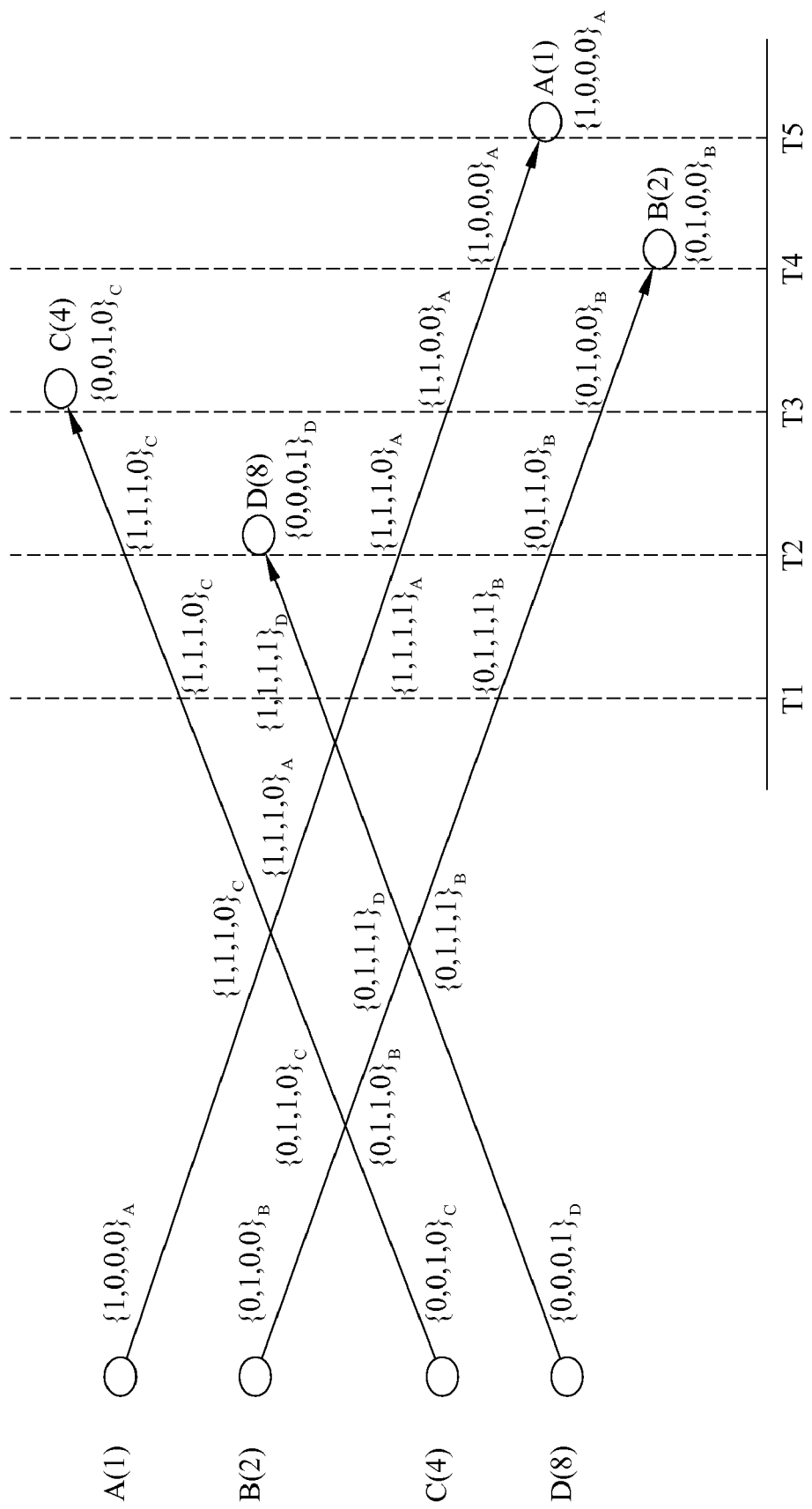
FIG. 5 shows a schematic view of an example of the interlaced fusion and identification algorithm, consistent with certain disclosed embodiments.

Following FIG. 4, FIG. 5 shows an exemplary interlaced fusion and identification algorithm, consistent with certain disclosed embodiments. As shown in FIG. 5, when objects finish crossing at time T1, and when the unique identification information of one of the objects, such as object D, is read at time T2 (i.e., when object D passes the endpoint or gate equipped with reader and camera), the identification D(8) of object D is immediately identified.

By the use of the interlaced fusion and identification algorithm, the tagging information filtering (i.e., deleting the tagging information of object D), checking and updating are performed on all the newest path tagging information of all the remaining combinations, i.e., objects A, B, C. Therefore, after deleting the tagging information of object D, the current newest path tagging information A,B,C,D(15) of object A is updated as A,B,C(7); i.e., $\{1,1,1,0\}_A$, indicating that object A has crossings with objects B, C. Similarly, after deleting the tagging information of object D, the current newest path tagging information B,C,D(14) of object B is updated as B,C(6); i.e., $\{0,1,1,0\}_B$, indicating that object B has crossings with object C. After deleting the tagging information of object D, the current newest path tagging information A,B,C(7) of object C is updated as A,B,C(7); i.e., $\{1,1,1,0\}_C$, indicating that object C has crossings with objects A, B. Therefore, the updated tagging information and the distribution matrix of region crossing are indicated as the field at time T2.

When object C passes the endpoint or gate equipped with reader and camera again at time T3, the identification of object C is immediately identified. The filtering (i.e., deleting the tagging information of object C), checking and updating of the tagging information are performed on all the remaining combination, i.e., the newest path tagging information of objects A, B. Therefore, after deleting the tagging information of object C, the current newest path tagging information A,B,C(7) of object A is updated as A,B(3); i.e., $\{1,1,0,0\}_A$. After deleting the tagging information of object C, the current newest path tagging information B,C(6) of object B is updated as B(2); i.e., $\{0,1,0,0\}_B$. This implies the B identity can be identified as early as at time T3. When object B passes the endpoint or gate equipped with reader and camera again at time T4, the tagging information of object B is still B(2), and the current path tagging information A,B(3), after deleting tagging information of object B, becomes $\{1,0,0,0\}_A$. In other words, the A identity can also be identified as early as at time T4. When object A passes the endpoint or gate equipped with reader and camera again at time T5, the tagging information of object A is still A(1).

It can be seen from FIG. 5, the disclosed embodiments use the interlaced fusion and identification algorithm for filtering, checking, and updating the tagging information. Each of the updated tagging information can be converted into a corresponding distribution matrix of region crossing. All the distribution matrixes of the region crossings of each tracked object may correctly and completely describe the motion path of the tracked object within the camera surveillance range so as to achieve object tracking and analysis. The tagging of the identification information having unique characteristics to the object identification image data is capable of performing fast searching and capturing image of specific object to reduce the processing time when retrieving the data.

The tagging of identification information having unique characteristics of FIG. 4 may be realized with an identifying and tagging module. The identifying and tagging module is capable of providing identification information having unique characteristics of at least an object within surveillance range, and tagging the identification information having unique characteristics to the corresponding object image data. Each tagged image data may be recorded or stored in a storage device for fast searching or motion path reconstruction.

Figure 6:
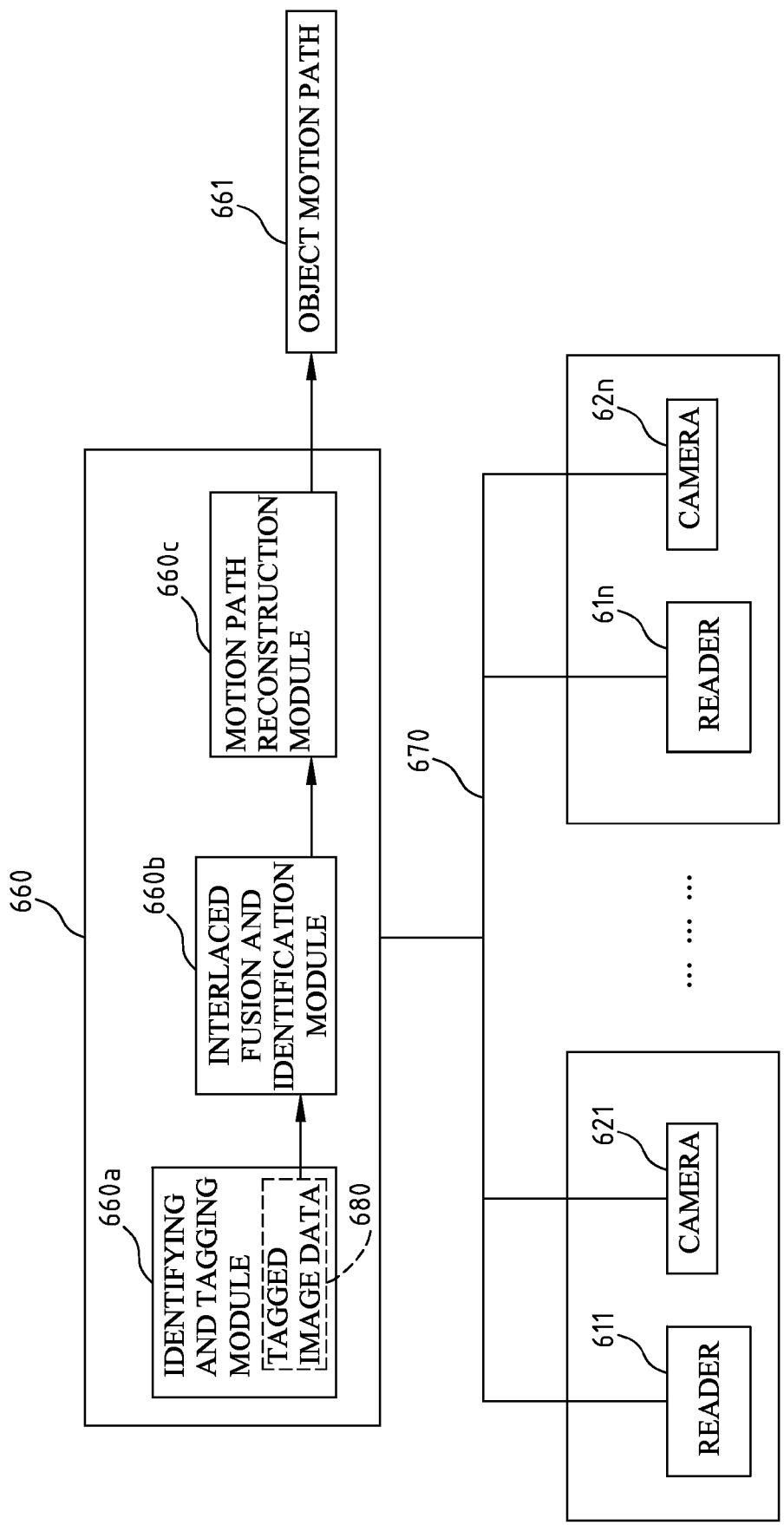
FIG. 6 shows a schematic view of an exemplary motion path reconstruction system utilizing the unique identification characteristics, consistent with certain disclosed embodiments.

The identifying and tagging module is capable of cooperating with a backend server and a communication network to reconstruct the object motion path. FIG. 6 shows a schematic view of an exemplary path reconstruction system utilizing the unique identification, consistent with certain disclosed embodiments.

Referring to FIG. 6, the motion path reconstruction system comprises a plurality of readers 611-61n, a plurality of cameras 621-62n, and a backend server 660. Readers 611-61n and cameras 621-62n communicate and exchange data with server 660 through communication network 670. Server 660 may include an identifying and tagging module 660a, an interlaced fusion and identification module 660b and a motion path reconstruction module 660c.

Readers 611-61n read the identification information having unique characteristics of at least an object. For example, reader 611 reads the identification information having unique characteristics of an object within the surveillance range. Cameras 621-62n capture image data of at least an object within the surveillance range. For example, camera 621 captures the image data of an object with identification information having unique characteristics.

A reader and a camera may be both installed at an endpoint or gate. For example, an endpoint or gate may be equipped with both a reader and a camera. The identification information having unique characteristics may be RFID tag identification, and the acquisition of the RFID tag identification is in compliance with the RFID protocol and is transmitted through radio wave to readers 611-61n. Readers 611-61n may be readers that can read RFID identification or biometric identification. RFID readers may be active or passive RFID devices.

Server 660 may further perform encryption/decryption on the image data. Communication network 670 may be either wired or wireless.

Identifying and tagging module 660*a* identifies and tags the image data, and may further store the tagged image data 680. Interlaced fusion and identification module 660*b* performs filtering, checking and updating on the tagged image data 680. The operation of filtering, checking and updating may be accomplished by either software or hardware. Motion path reconstruction module 660*c* recovers the tagged object image data to let them regress to their original identity data and reconstructs the motion path of each object 661. As aforementioned, both may correctly and completely show the motion path of the tracked object within the surveillance range.

Therefore, the exemplary embodiments according to the present invention at least disclose the following effects: the present invention may completely track the motion path of the object within the surveillance range; the present invention may identify the object and track the object; and the present invention is applicable both indoors and outdoors within the surveillance range.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A tagging method utilizing unique identification characteristics for tracking objects, comprising the steps of:
    reading identification information having unique characteristics of an object in a region, and capturing image data of said object;
    tagging the identification information of said object to the image data of said object;
    detecting the tagged image data of each of the objects crossing the tagged image data of other objects and re-tagging the image data of crossed objects with combination of the identification information of the crossed objects; and
    updating the tagged image data of the objects when the identification information of one of the objects within the region is read again by at least a reader at an endpoint or a gate by deleting the identification information of the one object being read again from the tagged image data of other objects.

2. The tagging method as claimed in claim 1, wherein the identification information having unique characteristics employs a radio frequency identification for reading the identification information.

3. The tagging method as claimed in claim 1, wherein the identification information having unique characteristics employs a biometrics identification for reading the identification information.

4. The tagging method as claimed in claim 1, wherein data format employed in the step of tagging the identification information having unique characteristics to the image data of said object is selected from a group consisting of "A", "B", "C", "A+B", "A+C", "B+C", and "A+B+C" where A=numerical value, B=text, and C=vector.

5. The tagging method as claimed in claim 1, wherein the step of tagging the identification information having unique characteristics to the image data of said object is accomplished by a digital watermark.

6. The tagging method as claimed in claim 1, wherein the step of tagging the identification information having unique characteristics to the image data of said object is accomplished by an annotation function tool in MPEG-7.

7. The tagging method as claimed in claim 1, wherein when an object passes an endpoint or a gate equipped with at least a reader and at least a camera, the identification information having unique characteristics and the image data of the object are read and captured simultaneously.

8. A path reconstruction method utilizing unique identification characteristics for constructing object motion paths of a plurality of objects, comprising the steps of:
    continuously inputting an object identification image for each of the objects within camera surveillance range and reading, at least once, identification information having unique characteristics for each of the objects;
    tagging the identification information having unique characteristics of each of the objects to said object identification image of the corresponding object;
    detecting said object identification image of each of the objects crossing other object identification images during motion and re-tagging the object identification images of crossed objects with combination of the identification information of the crossed objects;
    at each crossing, obtaining a distribution matrix of region crossing of each of the objects within the camera surveillance range;
    when the identification information having unique characteristics of one of the objects within the camera surveillance range is read again by at least a reader at an endpoint or a gate, performing filtering, checking, and updating the tagged object identification images; and
    after the identification information having unique characteristics of each of the objects within the camera surveillance range has been read again, recovering the tagged object identification images to the original identification information and reconstructing the object motion paths.

9. The path reconstruction method as claimed in claim 8, wherein said filtering, checking and updating the tagged object identification images is accomplished by using an interlaced fusion and identification algorithm.

10. The path reconstruction method as claimed in claim 9, wherein said interlaced fusion and identification algorithm is to perform "M and (not N)" operation on each M, where M is the newest distribution matrix of region crossing of an object that does not pass the endpoint or gate again at time T(n), and the identification information of the object is not read by the reader, and N is the distribution matrix of region crossing of the object that passes the endpoint or gate equipped with the reader again at time T(n), and the identification information of the object is read by the reader.

11. A motion path reconstruction system utilizing unique identification characteristics, comprising:
    a plurality of readers, for reading identification information having unique characteristics of at least an object;
    a plurality of cameras, for capturing image data of at least an object; and
    a server, further including an identifying and tagging module, an interlaced fusion and identification module and a motion path reconstruction module, said identifying and tagging module tagging the identification information of an object to the image data of the corresponding object, said interlaced fusion and identification module filtering, checking and updating the tagged image data, and said motion path reconstruction module recovering the tagged image data to the original identification information and reconstructing motion path;

where said interlaced fusion and identification module detects the tagged image data of each of the objects crossing the tagged image data of other objects and re-tagging the image data of crossed objects with combination of the identification information of the crossed objects, and updates the tagged image data of the objects when the identification information of one of the objects within the region is read again by at least a reader at an endpoint or a gate by deleting the identification information of the one object being read again from the tagged image data of other objects, and said plurality of readers and said plurality of cameras communicating and exchanging data with said server through a communication network.

12. The motion path reconstruction system as claimed in claim 11, wherein the reader makes use of either radio frequency identification (RFID) or biometrics identification to perform the reading of identification information.

13. The motion path reconstruction system as claimed in claim 11, wherein the motion path of at least one of said at least an object is tracked by the tagged image data.

14. The motion path reconstruction system as claimed in claim 11, wherein said motion path of at least one of said at least an object is tracked by a distribution matrix of region crossing.

15. The motion path reconstruction system as claimed in claim 11, wherein said communication network is either wired or wireless communication network.

16. The motion path reconstruction system as claimed in claim 11, wherein said interlaced fusion and identification module is realized either by software module or by hardware module.

17. The motion path reconstruction system as claimed in claim 12, wherein said RFID identification reader is either an active RFID device or a passive RFID device.

* * * * *